United States Patent
Huang

(10) Patent No.: US 9,163,817 B2
(45) Date of Patent: Oct. 20, 2015

(54) CEILING MOUNT OCCUPANCY SENSOR MODULE AND APPARATUS USING THE CEILING MOUNT OCCUPANCY SENSOR MODULE

(75) Inventor: Wen-I Huang, Taoyuan County (TW)

(73) Assignee: IR-TEC INTERNATIONAL LTD., Luzhu Township, Taoyuan County (TW)

( * ) Notice: Subject to any disclaimer, the term of this patent is extended or adjusted under 35 U.S.C. 154(b) by 550 days.

(21) Appl. No.: 13/572,747

(22) Filed: Aug. 13, 2012

(65) Prior Publication Data
US 2014/0043733 A1    Feb. 13, 2014

(51) Int. Cl.
*H05K 5/00*  (2006.01)
*H05K 7/00*  (2006.01)
*F21V 23/04* (2006.01)
*H05B 37/02* (2006.01)

(52) U.S. Cl.
CPC ........ *F21V 23/0471* (2013.01); *H05B 37/0227* (2013.01)

(58) Field of Classification Search
CPC .................................. F21V 21/04; F21S 8/02
USPC ............... 361/679.01–679.09, 679.1–679.19, 361/679.21–679.29, 679.31–679.45, 361/679.55–679.6, 724–747; 248/917–924, 248/80–88, 155.1–155.5, 166–173, 248/180.1–186.2, 229.1–231.51, 271.4, 248/292.14, 316.1–316.8
See application file for complete search history.

(56) References Cited

U.S. PATENT DOCUMENTS

| | | | |
|---|---|---|---|
| 4,733,339 A * | 3/1988 | Kelsall ........................... | 362/366 |
| 6,926,422 B2 * | 8/2005 | Bruwer et al. ................. | 362/157 |
| 2005/0200495 A1 * | 9/2005 | Sibalich et al. .......... | 340/693.11 |
| 2007/0165415 A1 * | 7/2007 | Henrici et al. ................ | 362/457 |

* cited by examiner

*Primary Examiner* — Jerry Wu
(74) *Attorney, Agent, or Firm* — Charles E. Baxley

(57) ABSTRACT

A ceiling mount occupancy sensor module has a body and a lens cover. The body includes a plurality of locking tabs respectively extending outwardly from side enclosures thereof. The lens cover is attached to the body. With the above-mentioned structure, the ceiling mount occupancy sensor module can be easily installed in a corresponding mounting hole of an apparatus by engagement of the locking tabs of the body with an edge of the mounting hole, and the ceiling mount occupancy sensor can be easily removed from the mounting hole of the apparatus by pressing the locking tabs of the body, thereby facilitating maintenance and replacement of the ceiling mount occupancy sensor.

16 Claims, 6 Drawing Sheets

CEILING MOUNT OCCUPANCY SENSOR MODULE AND APPARATUS USING THE CEILING MOUNT OCCUPANCY SENSOR MODULE

BACKGROUND OF THE INVENTION

1. Field of the Invention

The present invention relates to an occupancy sensor, and more particularly to a ceiling mount occupancy sensor module for easy assembly with different mounting apparatus, thereby facilitating installation, maintenance and replacement of the occupancy sensor.

2. Description of the Prior Arts

An occupancy sensor can be used to control lighting or heater, ventilation and air conditioner (HVAC) and installed at gateway, staircase, garage, conference room, class room, warehouse or any other place applicable. When an occupancy sensor detects infrared energy emitted by human body entering its field of view, the sensor will switch on the light or HVAC and keep it on or operating as long as it continues to detect the activities of human body within its field of view. The sensor will switch off the light or HVAC if it does not detect any human activity within a period of pre-set delay time. Thus, the occupancy sensors are commonly used for energy saving by means of shutting off the unneeded lighting or HVAC operation.

The conventional ceiling mount occupancy sensor is normally with a fixed enclosure designed for single mounting option. However, such an occupancy sensor sometimes cannot meet installation requirements in real practice due to different ceiling structure and interior decor, thus the occupancy sensor with various mounting options are needed. For instance, hard ceiling may require surface mount occupancy sensor, suspended ceiling may require recess mount and high bay ceiling may require drop-off junction box mount. With single mounting option occupancy sensor, it is not possible to fulfill various mounting requirements.

To overcome the shortcomings, the present invention provides a ceiling mount occupancy sensor module and an apparatus using the ceiling mount occupancy sensor module to obviate the aforementioned problems.

SUMMARY OF THE INVENTION

The main object of the present invention is to provide a ceiling mount occupancy sensor module for easy assembly with different mounting apparatus, thereby facilitating installation, maintenance and replacement of the ceiling mount occupancy sensor.

To achieve the foregoing objective, the ceiling mount occupancy sensor module in accordance with the present invention comprises a body and a lens cover. The body includes a mounting portion, a locating board, a human movement sensing component and a plurality of switches. The mounting portion has a bottom, a periphery, a plurality of side enclosures and a plurality of locking tabs. The locking tabs are resilient and respectively extend outwardly from the side enclosures of the mounting portion. The locating board is formed on the bottom of the mounting portion and has a lower enclosure and a periphery protruding from the periphery of the mounting portion. The human movement sensing component and the switches are configured through the lower enclosure of the locating board. The lens cover is attached to the locating board of the body and covers the human movement sensing component. With the above-mentioned structure, the ceiling mount occupancy sensor module can be easily installed in a corresponding mounting hole of an apparatus by engagement of the locking tabs of the body with an edge of the mounting hole, and the ceiling mount occupancy sensor can be easily removed from the mounting hole of the apparatus by pressing the locking tabs of the body, thereby facilitating maintenance and replacement of the ceiling mount occupancy sensor.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
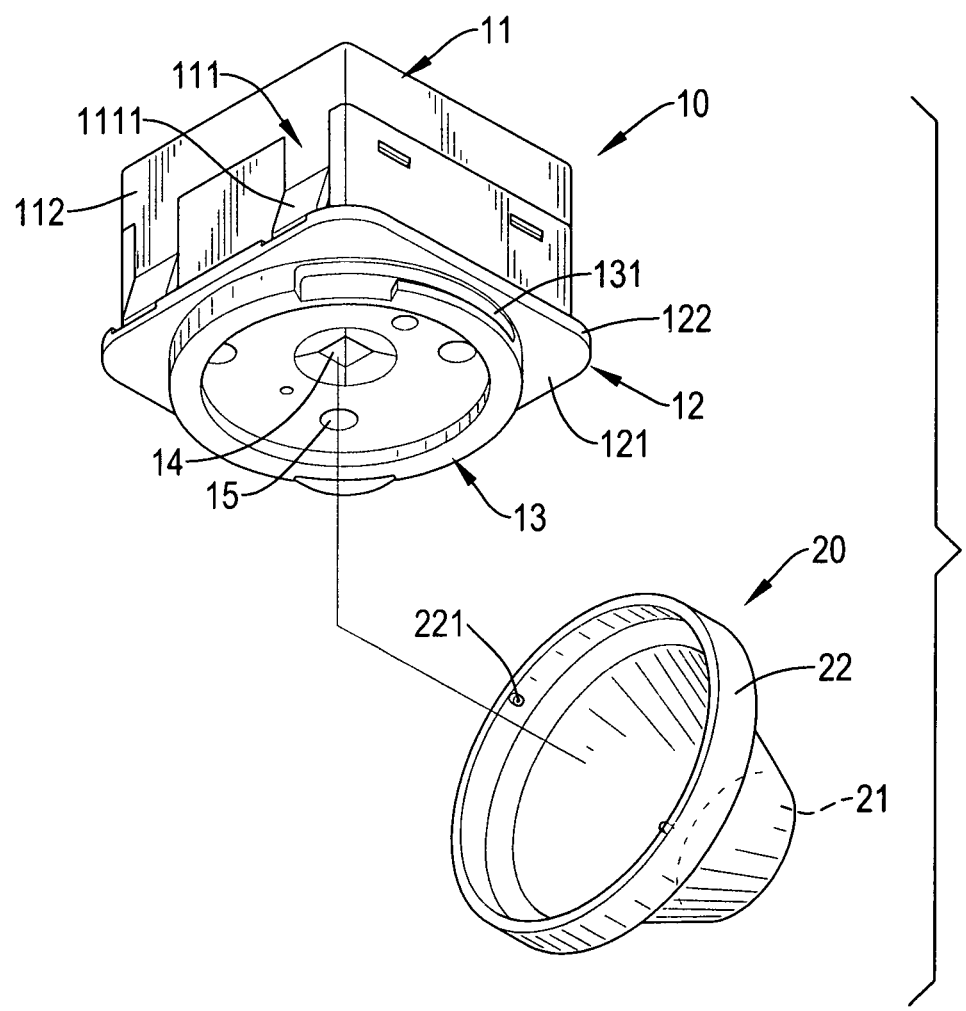
FIG. 1 is an exploded perspective view of a ceiling mount occupancy sensor module in accordance with the present invention.
Figure 2:
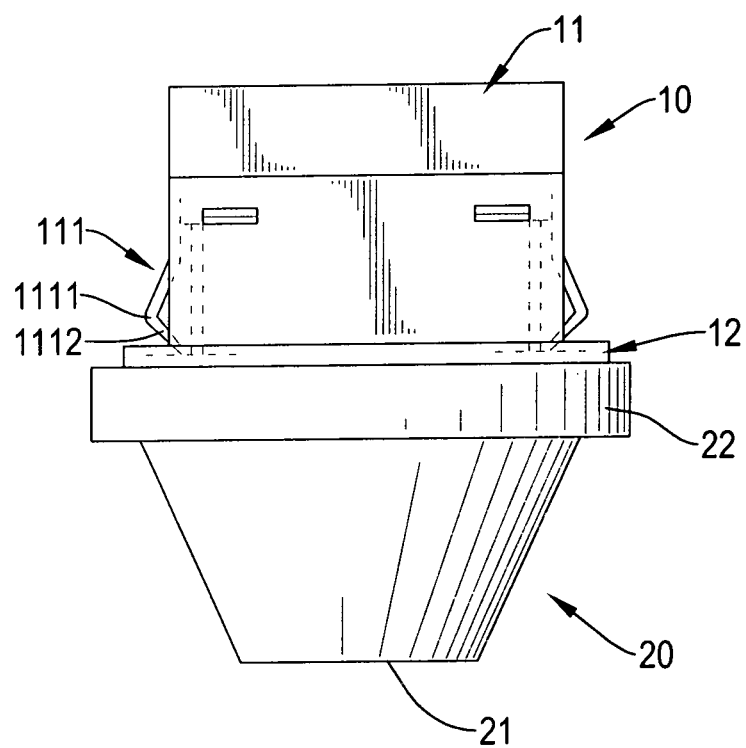
FIG. 2 is a side view of the ceiling mount occupancy sensor module in FIG. 1.

With reference to FIGS. 1 and 2, a ceiling mount occupancy sensor module in accordance with the present invention comprises a body 10 and a lens cover 20.

The body 10 includes a mounting portion 11, a locating board 12, a ring 13, a human movement sensing component 14 and a plurality of switches 15. The mounting portion 11 has a bottom, a periphery, a plurality of side enclosures 112 and a plurality of locking tabs 111. The locking tabs 111 respectively extend longitudinally outwardly from the side enclosures 112 of the mounting portion 11. Each locking tab 111 is resilient, is bent and has a connecting section 1111 and an abutting section 1112. A top end of the connecting section 1111 is connected to the side enclosure 112 of the mounting portion 11. A bottom end of the connecting section 1111 is connected to a top end of the abutting section 1112. A bottom end of the abutting section 1112 is adjacent to the bottom of the mounting portion 11. The locating board 12 is formed on the bottom of the mounting portion 11 and has a lower enclosure 121 and a periphery 122. The periphery 122 of the locating board 12 protrudes from the periphery of the mounting portion 11.

The ring 13 extends from the lower enclosure 121 of the locating board 12 and has an outer enclosure and a plurality of grooves 131. The grooves 131 are respectively formed in the outer enclosure of the ring 13 and each groove 131 has a longitudinal portion and a lateral portion. The lateral portion extends from and communicates with a top of the longitudinal portion. The human movement sensing component 14 and the switches 15 are configured through the lower enclosure 121 of the locating board 12 and are disposed within the ring 13. The human movement sensing component 14 and the switches 15 are conventional and thus descriptions thereof will be omitted.

In a preferred embodiment, the mounting portion 11 of the body 10 is rectangular prism-shaped and has four side enclosures 112 and four locking tabs 111. Each two of the locking tabs 111 extend from one of the two opposite side enclosures 112 of the mounting portion 11. The locating board 12 is rectangular.

The lens cover 20 is truncated cone-shaped, is attached to the locating board 12 of the body 10, covers the human movement sensing component 14 and the switches 15 and has an open end, a closed end and diameters. The diameters decrease progressively from the open end to the closed end. The closed end has a circular enclosure 21. The open end has an annular sidewall 22. The annular sidewall 22 has an inner enclosure and a plurality of projections 221. The projections 221 separately extend from the inner enclosure of the annular sidewall 22 and respectively correspond in position to the grooves 131 of the body 10. The projections 221 are disposed into the longitudinal portions of the grooves 131 and the lens cover 20 is then rotated to make the projections 221 engage the lateral portions of the grooves 131. The lens cover 20 allows infrared energy to pass therethrough to focus on the human movement sensing component 14 so as to expand the field of view of the human movement sensing component 14.

Figure 3:
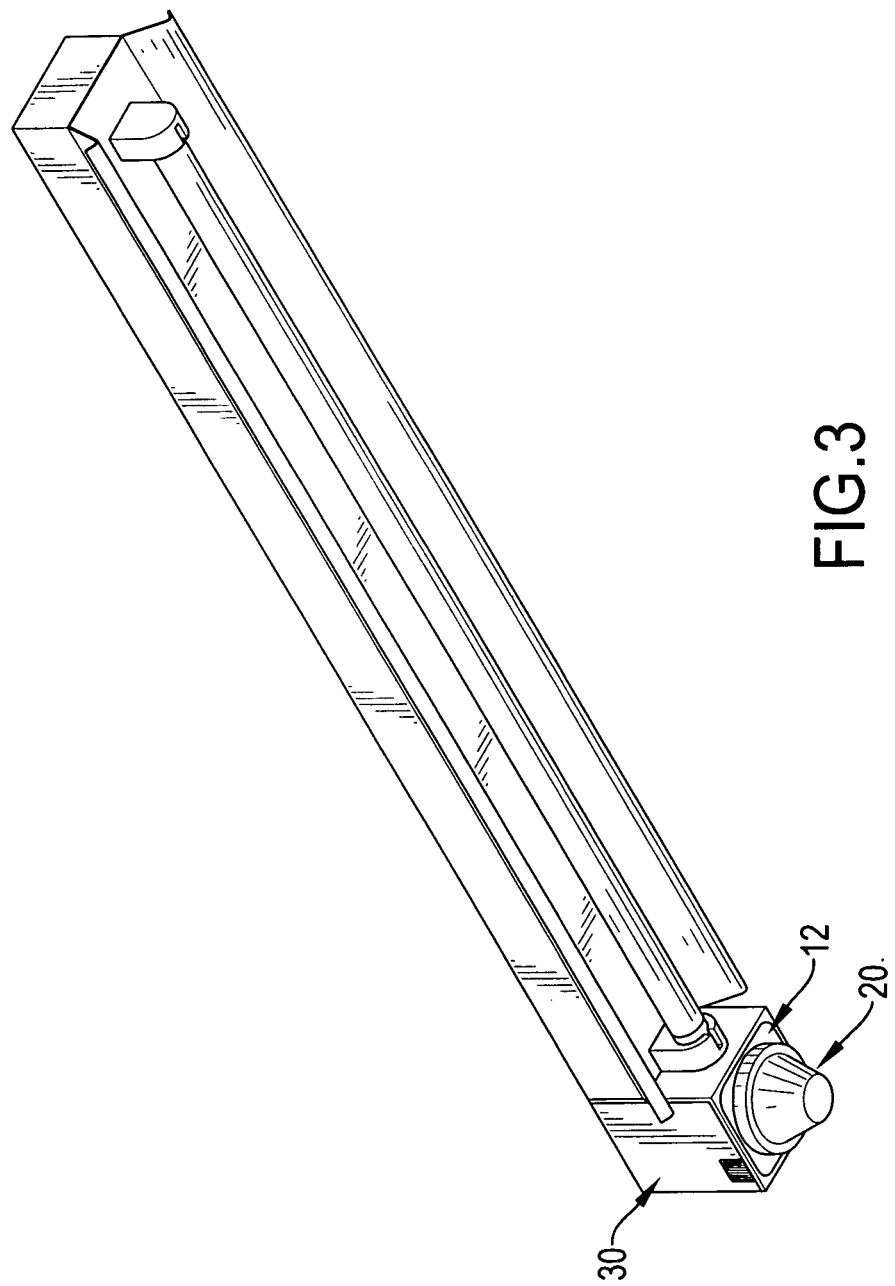
FIG. 3 is a perspective view of an apparatus using the ceiling mount occupancy sensor module in accordance with the present invention.
Figure 4:
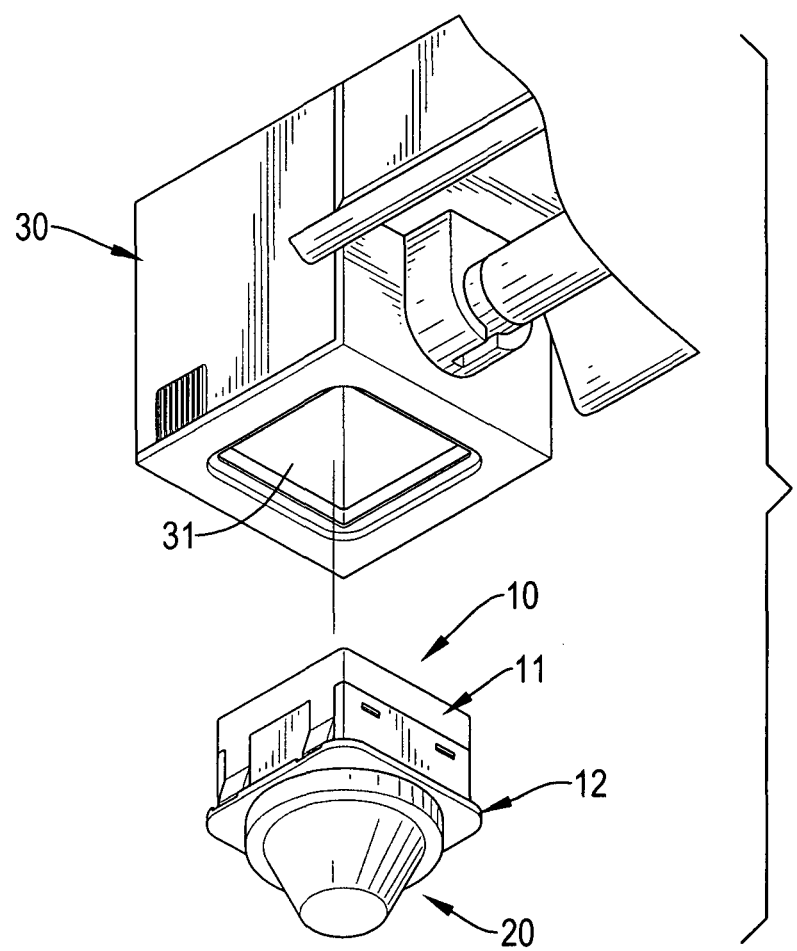
FIG. 4 is an enlarged partial exploded perspective view of the apparatus in FIG. 3.

With reference to FIGS. 3 and 4, the ceiling mount occupancy sensor module of the present invention is installed in an apparatus. The apparatus may be a lamp as shown and comprises a rectangular frame 30 including a mounting hole 31. The mounting hole 31 has an upper portion and a lower portion. A diameter of the upper portion of the mounting hole 31 is smaller than a diameter of the lower portion of the mounting hole 31. The upper portion of the mounting hole 31 corresponds dimensionally to the mounting portion 11 of the body 10. The lower portion of the mounting hole 31 corresponds dimensionally to the locating board 12 of the body 10.

Figure 6:
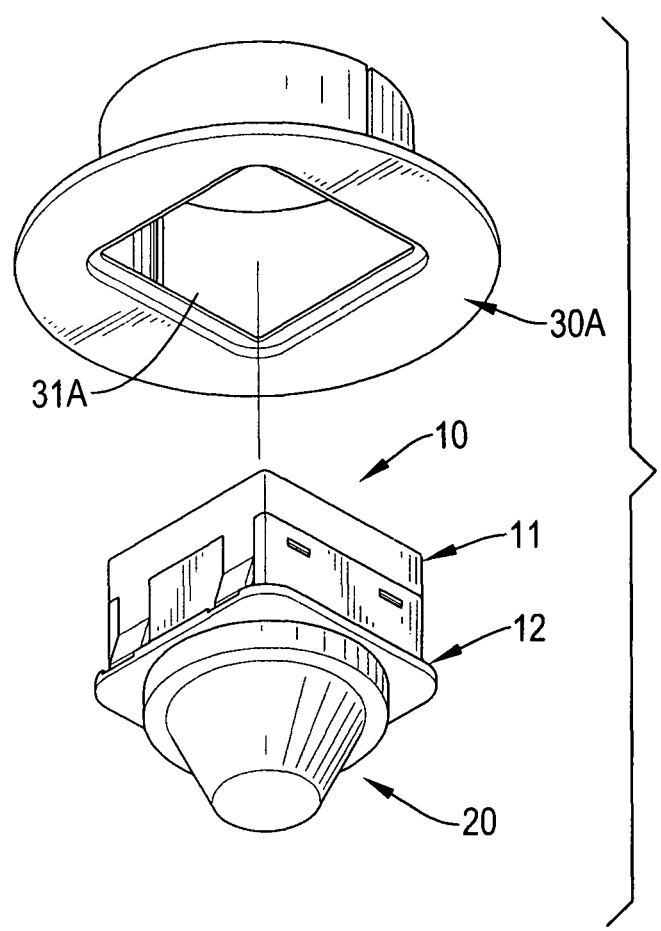
FIG. 6 is an exploded perspective view of another embodiment of an apparatus using the ceiling mount occupancy sensor module in accordance with the present invention.

With reference to FIG. 6, in another embodiment of the apparatus, the apparatus comprises a circular frame 30A including a mounting hole 31A. The mounting hole 31A has an upper portion and a lower portion. A diameter of the upper portion of the mounting hole 31A is smaller than a diameter of the lower portion of the mounting hole 31A. The upper portion of the mounting hole 31A corresponds dimensionally to the mounting portion 11 of the body 10. The lower portion of the mounting hole 31A corresponds dimensionally to the locating board 12 of the body 10.

Figure 5:
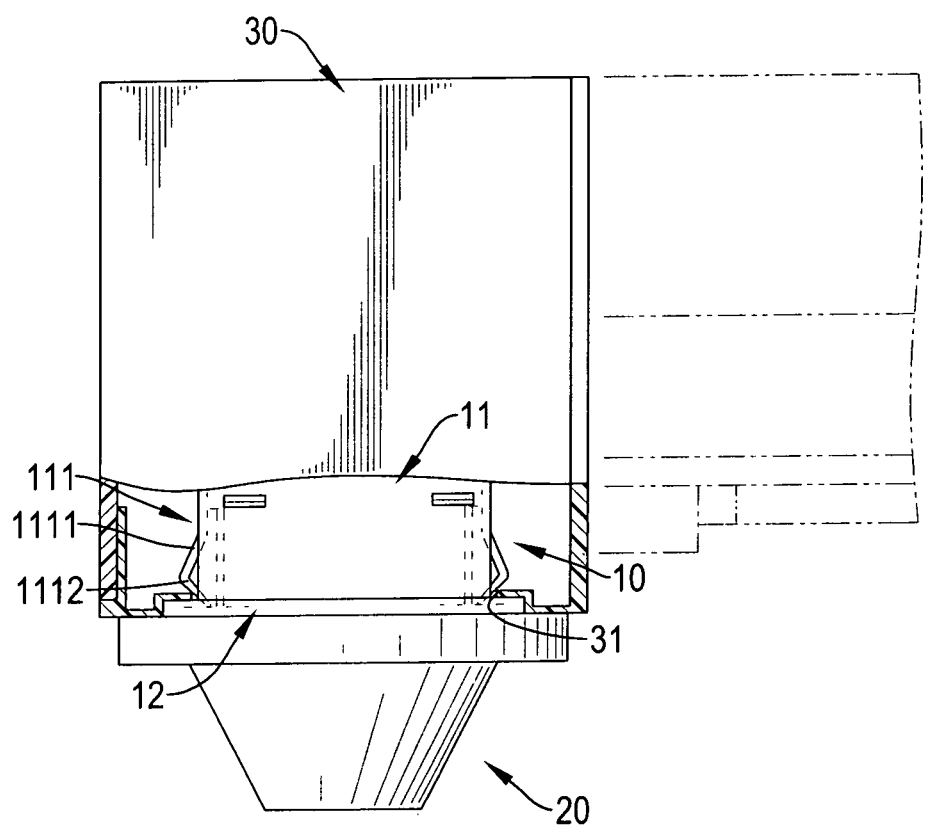
FIG. 5 is an enlarged side view in partial section of the apparatus in FIG. 3.

With further reference to FIG. 5, to install the ceiling mount occupancy sensor module in the apparatus, the mounting portion 11 of the body 10 is mounted through the mounting hole 31 of the frame 30 to make the locating board 12 of the body 10 disposed in the lower portion of the mounting hole 31. During the above described installation procedure, the connecting sections 1111 of the locking tabs 111 are pressed by an edge of the upper portion of the mounting hole 31 so that the locking tabs 111 are compressed and store energy, the locking tabs 111 are compressed until the connecting sections 1111 of the locking tabs 111 pass through the mounting hole 31. As the connecting sections 1111 of the locking tabs 111 pass through the mounting hole 31, the locking tabs 111 release the stored energy to cause the abutting sections 1112 of the locking tabs 111 to abut the edge of the upper portion of the mounting hole 31. Thus, the ceiling mount occupancy sensor module can be easily installed in the apparatus. In addition, the ceiling mount occupancy sensor module can be easily removed from the apparatus by pressing the locking tabs 111, thereby facilitating maintenance and replacement of the ceiling mount occupancy sensor.

Even though numerous characteristics and advantages of the present invention have been set forth in the foregoing description, together with details of the structure and features of the invention, the disclosure is illustrative only. Changes may be made in the details, especially in matters of shape, size and arrangement of parts within the principles of the invention to the full extent indicated by the broad general meaning of the terms in which the appended claims are expressed.

What is claimed is:

1. A ceiling mount occupancy sensor module comprising:
   a body including:
      a mounting portion having a bottom;
      a locating board formed on the bottom of the mounting portion and having a lower enclosure;
      a ring extending from the lower enclosure of the locating board and having:
         an outer enclosure; and
         a plurality of grooves respectively formed in the outer enclosure of the ring, each groove having:
            a longitudinal portion; and
            a lateral portion extending from and communicating with a top of the longitudinal portion;
      a human movement sensing component configured through the lower enclosure of the locating board and disposed within the ring; and
      a plurality of switches configured through the lower enclosure of the locating board and disposed within the ring; and
   a lens cover attached to the locating board of the body, covering the human movement sensing component, and including:
      a closed end; and
      an open end having an annular sidewall, the annular sidewall having:
         an inner enclosure; and
         a plurality of projections separately extending from the inner enclosure of the annular sidewall and respectively corresponding in position to the plurality of grooves of the body, the plurality of projections disposed into the longitudinal portions of the plurality of grooves and the lens cover being then rotated to make the projections engage the lateral portions of the plurality of grooves.

2. The ceiling mount occupancy sensor module as claimed in claim 1, wherein
   the mounting portion of the body has
      a periphery;
      a plurality of side enclosures; and
      a plurality of locking tabs being resilient and respectively extending outwardly from the side enclosures of the mounting portion; and
   the locating board of the body further includes
      a periphery protruding from the periphery of the mounting portion.

3. The ceiling mount occupancy sensor module as claimed in claim 2, wherein each locking tab of the mounting portion of the body is bent and has a connecting section and an abutting section, a top end of the connecting section is connected to the side enclosure of the mounting portion, a bottom end of the connecting section is connected to a top end of the abutting section and a bottom end of the abutting section is adjacent to the bottom of the mounting portion.

4. The ceiling mount occupancy sensor module as claimed in claim 2, wherein
   the mounting portion of the body is rectangular prism-shaped and has four side enclosures; and
      four locking tabs, each two of the locking tabs extending from one of the two opposite side enclosures of the mounting portion; and
   the locating board of the body is rectangular.

5. The ceiling mount occupancy sensor module as claimed in claim 3, wherein
the mounting portion of the body is rectangular prism-shaped and has four side enclosures; and
four locking tabs, each two of the locking tabs extending from one of the two opposite side enclosures of the mounting portion; and
the locating board of the body is rectangular.

6. The ceiling mount occupancy sensor module as claimed in claim 2, wherein the lens cover is truncated cone-shaped and has diameters decreasing progressively from the open end to the closed end.

7. The ceiling mount occupancy sensor module as claimed in claim 3, wherein the lens cover is truncated cone-shaped and has diameters decreasing progressively from the open end to the closed end.

8. The ceiling mount occupancy sensor module as claimed in claim 4, wherein the lens cover is truncated cone-shaped and has diameters decreasing progressively from the open end to the closed end.

9. The ceiling mount occupancy sensor module as claimed in claim 5, wherein the lens cover is truncated cone-shaped and has diameters decreasing progressively from the open end to the closed end.

10. An apparatus using the ceiling mount occupancy sensor module as claimed in claim 2 comprising a rectangular frame including a mounting hole having an upper portion and a lower portion, a diameter of the upper portion of the mounting hole being smaller than a diameter of the lower portion of the mounting hole, the upper portion of the mounting hole corresponding dimensionally to the mounting portion of the body and the lower portion of the mounting hole corresponding dimensionally to the locating board of the body.

11. An apparatus using the ceiling mount occupancy sensor module as claimed in claim 3 comprising a rectangular frame including a mounting hole having an upper portion and a lower portion, a diameter of the upper portion of the mounting hole being smaller than a diameter of the lower portion of the mounting hole, the upper portion of the mounting hole corresponding dimensionally to the mounting portion of the body and the lower portion of the mounting hole corresponding dimensionally to the locating board of the body.

12. An apparatus using the ceiling mount occupancy sensor module as claimed in claim 4 comprising a rectangular frame including a mounting hole having an upper portion and a lower portion, a diameter of the upper portion of the mounting hole being smaller than a diameter of the lower portion of the mounting hole, the upper portion of the mounting hole corresponding dimensionally to the mounting portion of the body and the lower portion of the mounting hole corresponding dimensionally to the locating board of the body.

13. An apparatus using the ceiling mount occupancy sensor module as claimed in claim 5 comprising a rectangular frame including a mounting hole having an upper portion and a lower portion, a diameter of the upper portion of the mounting hole being smaller than a diameter of the lower portion of the mounting hole, the upper portion of the mounting hole corresponding dimensionally to the mounting portion of the body and the lower portion of the mounting hole corresponding dimensionally to the locating board of the body.

14. An apparatus using the ceiling mount occupancy sensor module as claimed in claim 2 comprising a circular frame including a mounting hole having an upper portion and a lower portion, a diameter of the upper portion of the mounting hole being smaller than a diameter of the lower portion of the mounting hole, the upper portion of the mounting hole corresponding dimensionally to the mounting portion of the body and the lower portion of the mounting hole corresponding dimensionally to the locating board of the body.

15. An apparatus using the ceiling mount occupancy sensor module as claimed in claim 3 comprising a circular frame including a mounting hole having an upper portion and a lower portion, a diameter of the upper portion of the mounting hole being smaller than a diameter of the lower portion of the mounting hole, the upper portion of the mounting hole corresponding dimensionally to the mounting portion of the body and the lower portion of the mounting hole corresponding dimensionally to the locating board of the body.

16. An apparatus using the ceiling mount occupancy sensor module as claimed in claim 4 comprising a circular frame including a mounting hole having an upper portion and a lower portion, a diameter of the upper portion of the mounting hole being smaller than a diameter of the lower portion of the mounting hole, the upper portion of the mounting hole corresponding dimensionally to the mounting portion of the body and the lower portion of the mounting hole corresponding dimensionally to the locating board of the body.

* * * * *